May 20, 1930. K. RÖDER 1,759,817
STEAM TURBINE
Filed Dec. 29, 1927
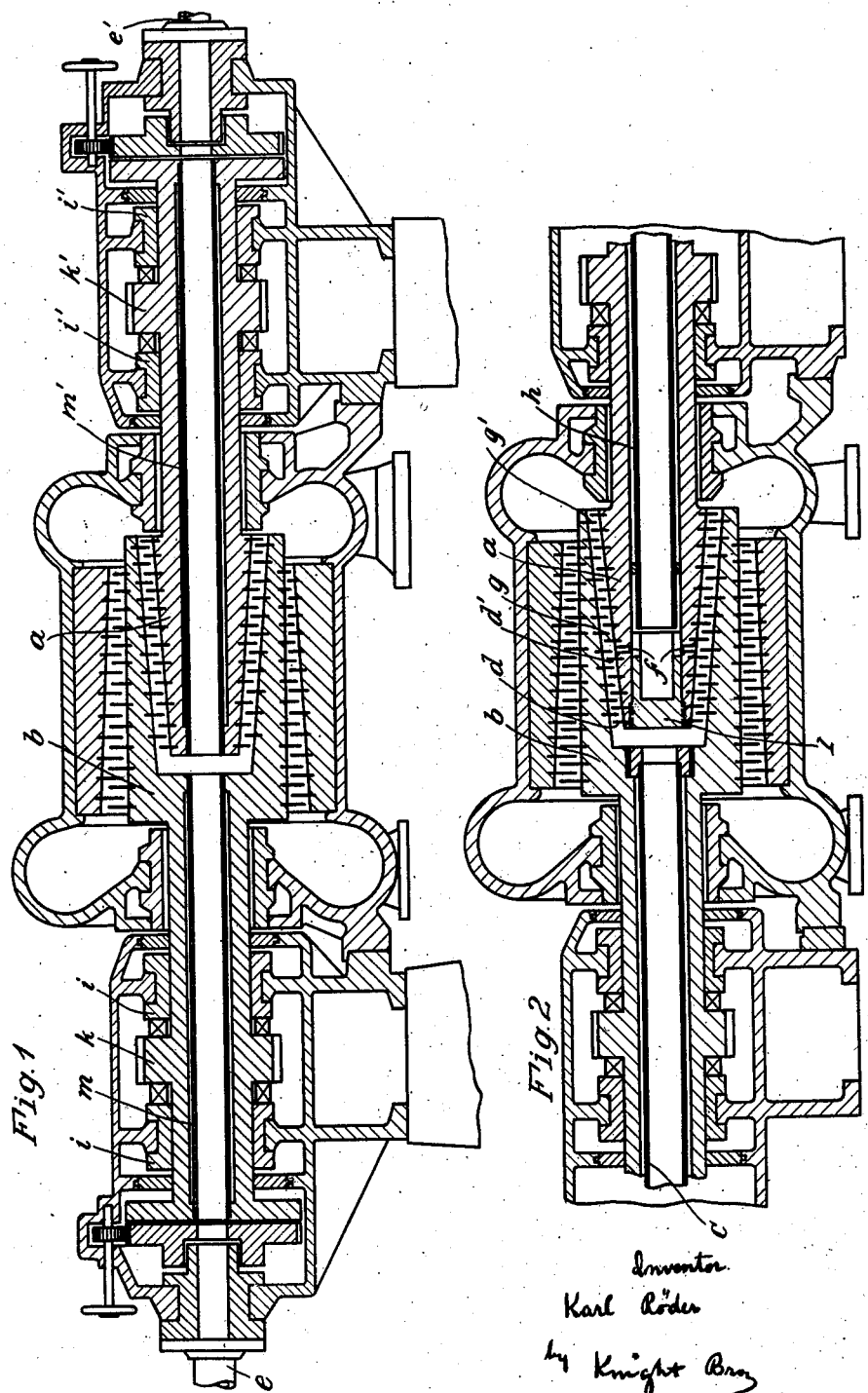
Inventor.
Karl Röder
by Knight Bros
attorneys Patented May 20, 1930

1,759,817

UNITED STATES PATENT OFFICE

KARL RÖDER, OF HANOVER, GERMANY

STEAM TURBINE

Application filed December 29, 1927, Serial No. 243,396, and in Germany June 23, 1926.

My invention relates to improvements in steam turbines.

For the economical utilization of small steam volumes in steam turbines, and particularly in the high-pressure stages, it is necessary to use small admission diameters in order that the height of the blades may not drop below a minimum value. To prevent, furthermore, that the number of stages becomes excessively large, it appears advantageous to use two rotors running in opposite directions.

Up to now success has only been attained in developing suitable constructions of turbines of the oppositely revolving rotor type with radial admission stages. In this case the admission diameter rises from stage to stage so quickly, however, that unfavorable flow conditions develop when the turbine is operated with high-pressure steam.

Axial flow turbines with rotors revolving in opposite directions have also been suggested, but have never attained any importance, because the suggestions disclosed up to now did not contain sufficient data to base a practical construction upon them. These propositions are in any case utterly unsuitable for high-pressure steam.

My invention consists in providing a construction of a steam or gas turbine with rotors running in opposite directions and with preponderating axial admission, which is suitable for industrial application.

I attain this object by giving the rotors the form of an elongated cylinder, one portion of which serves as a shaft and the other free ended portion, of slightly larger diameter, serving as a carrier of the blades, the live steam being admitted through a central boring provided in the shaft portion of at least one rotor. This construction has the advantage over the prior art turbines of the double, telescoped rotor type, that the joints between the stationary and rotary portion of the turbine may be made of very small diameter, generally not much larger than the shaft diameter, and further that the reaction stresses occurring in axial direction are exerted upon turbine elements, also not much larger than the shaft diameter, thus permitting material reduction in weight and simpler construction.

The aforementioned shape of the rotors is particularly adapted for very high pressure and speed, as compared with the drum shaped large diameter turbines of this type heretofore employed in the art, whose packing joint diameter is many times larger than the shaft diameter, and therefore very unsuited for high pressures and speeds.

In the drawings affixed hereto and forming part of my specification two embodiments of my invention are illustrated by way of example, representing in Fig. 1, an axial section through one embodiment, and in Fig. 2, a similar section through another embodiment.

Referring to Fig. 1 of the drawings, $a$ is the inner and $b$ the outer admission part of the turbine. The two parts are journaled at $i'$ and $i$ and the power developed is transmitted by the pinions $k'$ and $k$ respectively. The admission of the steam may take place from one side or from both through the pipes $e'$ and $e$. In the bodies of the rotors are provided short pipes $m'$ and $m$ for the supply of steam. These pipes are fixed in position by expanding them, by rolling or the like, into the rotor bodies at the ends only.

In such a turbine an extremely economical regulation may be obtained by admitting the steam for small outputs merely through the central bore of the outer rotor, but when higher outputs are to be obtained through the bore of the inner rotor as well, the additional steam issuing between the blades at a row of blades which has a larger passage area than the first row of blades.

For this purpose the central bore of the inner rotor is closed at the inner end of the rotor and put in communication with one of the central rows of blades by means of radial bores. These central rows or stages present larger passage areas than the preceding rows of smaller diameter, in particular larger passages than the innermost row of blades. The central stage of blades of the inner rotor thus takes at equal pressure larger quantities of the driving medium than the first stage.

The dimensioning of the stages connected in series, i. e. of the stage located between the normal and the additional steam admission, takes place for the economical load which, as a rule, lies below the normal load. The number of the stages bypassed by the additional driving medium depends upon the degree of overload capacity demanded and the output required of the machine with decreasing pressure of the driving medium.

Fig. 2 illustrates such a modification of the regulation. The inner rotor is indicated by the reference letter $a$, the outer by $b$. In a central bore of the latter is accommodated the steam supply pipe $c$. The steam supplied by this pipe traverses all the rows of blades and thus also the stages $d$—$d'$. The inner rotor $a$ is likewise provided with a central bore, which however is closed at its inner end by the plug $l$. The radial bores $f$ put the inner bore in the rotor $a$ in communication with the rows of blades $g$ to $g'$. For small outputs the steam is admitted through the pipe $c$ only. If the load has risen so high that full stream pressure exists in front of the stage $d$, the steam pressure in front of the stage $g$ will be lower on account of the drop of pressure in the stages $d$ to $d'$. A further increase of the output now takes place by the admission of additional steam through the pipe $h$ in the bore of the inner rotor $a$. This steam bypasses the stages $d$ to $d'$ and enters directly into the stage $g$ and thus increases the pressure at this point. The pressure drop in the stages $d$ to $d'$ is thus reduced, and the quantity of steam flowing through the remaining stages and consequently the output of the turbine increased.

Various modifications and changes may be made without departing from the spirit and the scope of the invention, and I desire, therefore, that only such limitations shall be placed thereon as are imposed by the prior art.

I claim as my invention:

1. In a steam turbine, in combination, an inner rotor, having a plurality of axially spaced peripheral rows of blades upon its outer circumference, an outer hollow rotor, carrying on its inner circumference axially spaced rows of inwardly directed blades, said outer rotor enveloping the inner rotor along its bladed portion, a shaft for each rotor, carrying its rotor freely at its end, at least one of said shafts having a central longitudinal boring serving for admitting live operating steam through its interior to said rotors, and a separate tubular steam conduit disposed within said shaft boring and being sealed at its ends at narrow marginal portions against the end portions of said shaft boring.

2. In a steam turbine, in combination, an inner rotor, having a plurality of axially spaced peripheral rows of blades upon its outer circumference, an outer hollow rotor, carrying on its inner circumference axially spaced rows of inwardly directed blades, said outer rotor enveloping the inner rotor along its bladed portion, a shaft for each rotor, carrying its rotor freely at its end, each shaft having a central longitudinal boring and a tubular steam conduit disposed in each shaft boring and sealed at its ends against said shaft boring for supplying live steam to said rotors.

3. In a steam turbine, in combination, an inner rotor, having a plurality of axially spaced peripheral rows of blades upon its outer circumference, an outer hollow rotor, carrying on its inner circumference axially spaced rows of inwardly directed blades, said outer rotor enveloping the inner rotor along its bladed portion, a shaft for each rotor, carrying its rotor freely at its end, each shaft having a central longitudinal boring and a tubular steam conduit disposed in each shaft boring and sealed at its ends against said shaft boring, said inner rotor having radial borings intermediate its ends for conducting live steam directly from said conduit between intermediate rows of blades representing intermediate expansion stages of that rotor.

4. In a steam turbine, in combination, an inner rotor, having a plurality of axially spaced peripheral rows of blades upon its outer circumference, an outer hollow rotor, carrying on its inner circumference axially spaced rows of inwardly directed blades, said outer rotor enveloping the inner rotor along its bladed portion, a shaft for each rotor, carrying its rotor freely at its end, each shaft having a central longitudinal boring and a tubular steam conduit disposed in each shaft boring and sealed at its ends against said shaft boring, the steam conduit of said inner rotor being closed at its inner end, said rotor having radial borings leading from said conduit to intermediate rows of blades representing intermediate expansion stages of said rotor for conducting live steam directly to said stages.

5. In a steam turbine in combination an elongated roller-shaped rotor, one of the rotor portions serving as a shaft, the other, free ended portion being of slightly larger diameter and having a plurality of axially spaced peripheral rows of blades upon its outer circumference, a second rotor of similar configuration, one of its portions serving as a shaft and the other, free ended portion being of slightly larger diameter and surrounding the bladed portion of the first rotor and having axially spaced peripheral rows of blades upon its outer and inner periphery, the shaft portion of at least one rotor having a central longitudinal boring serving for admitting live operating steam through its interior to said rotors.

6. In a steam turbine in combination an elongated roller-shaped rotor, one of the rotor portions serving as a shaft, the other, free ended portion being of slightly larger diameter and having a plurality of axially spaced peripheral rows of blades upon its outer circumference, a second rotor of similar configuration, one of its portions serving as a shaft and the other, free ended portion being of slightly larger diameter and surrounding the bladed portion of the first rotor and having axially spaced peripheral rows of blades upon its outer and inner periphery, the shaft portion of at least one rotor having a central longitudinal boring serving for admitting live operating steam through its interior to said rotors, and a stator surrounding the bladed portion of the second rotor and having a plurality of axially spaced peripheral rows of blades on its inner periphery to cooperate with the outer peripheral blades of said second rotor.

In testimony whereof I affix my signature.

KARL RÖDER.